United States Patent

Rietmann

[11] Patent Number: 5,819,049
[45] Date of Patent: Oct. 6, 1998

[54] MULTI-MEDIA RECORDING SYSTEM AND METHOD

[76] Inventor: Sandra D. Rietmann, P.O. Box 141, Rochester, Minn. 55903

[21] Appl. No.: 808,799

[22] Filed: Feb. 28, 1997

[51] Int. Cl.$^6$ .................................................. G06F 17/00
[52] U.S. Cl. ....................................................... 395/200.69
[58] Field of Search ........................ 395/200.79, 200.49; 235/375

[56] References Cited

U.S. PATENT DOCUMENTS

| | | | |
|---|---|---|---|
| 5,339,239 | 8/1994 | Manabe et al. | 395/201 |
| 5,535,118 | 7/1996 | Chumbly | 395/201 |
| 5,572,442 | 11/1996 | Schulhof et al. | 395/200.49 |
| 5,619,508 | 4/1997 | Davis et al. | 370/495 |
| 5,629,867 | 5/1997 | Goldman | 381/77 |

*Primary Examiner*—Ellis B. Ramirez

[57] ABSTRACT

A new multi-media recording system and method for providing a new way to distribute music and movies to consumers. The inventive device includes a multi-media formatting center for processing audio/visual media to produce an audio/visual media signal, a computer associated with the formatting center for storing the signal, a modem for transferring the signal over a communication channel, a second computer remote from the first computer which receives the signal, and a recording device which is interfaced with the second computer for recording the signal and processing the signal to reproduce the audio/visual media. The recording device preferably includes a detachable faceplate having a computer chip thereon for recording the signal.

9 Claims, 3 Drawing Sheets

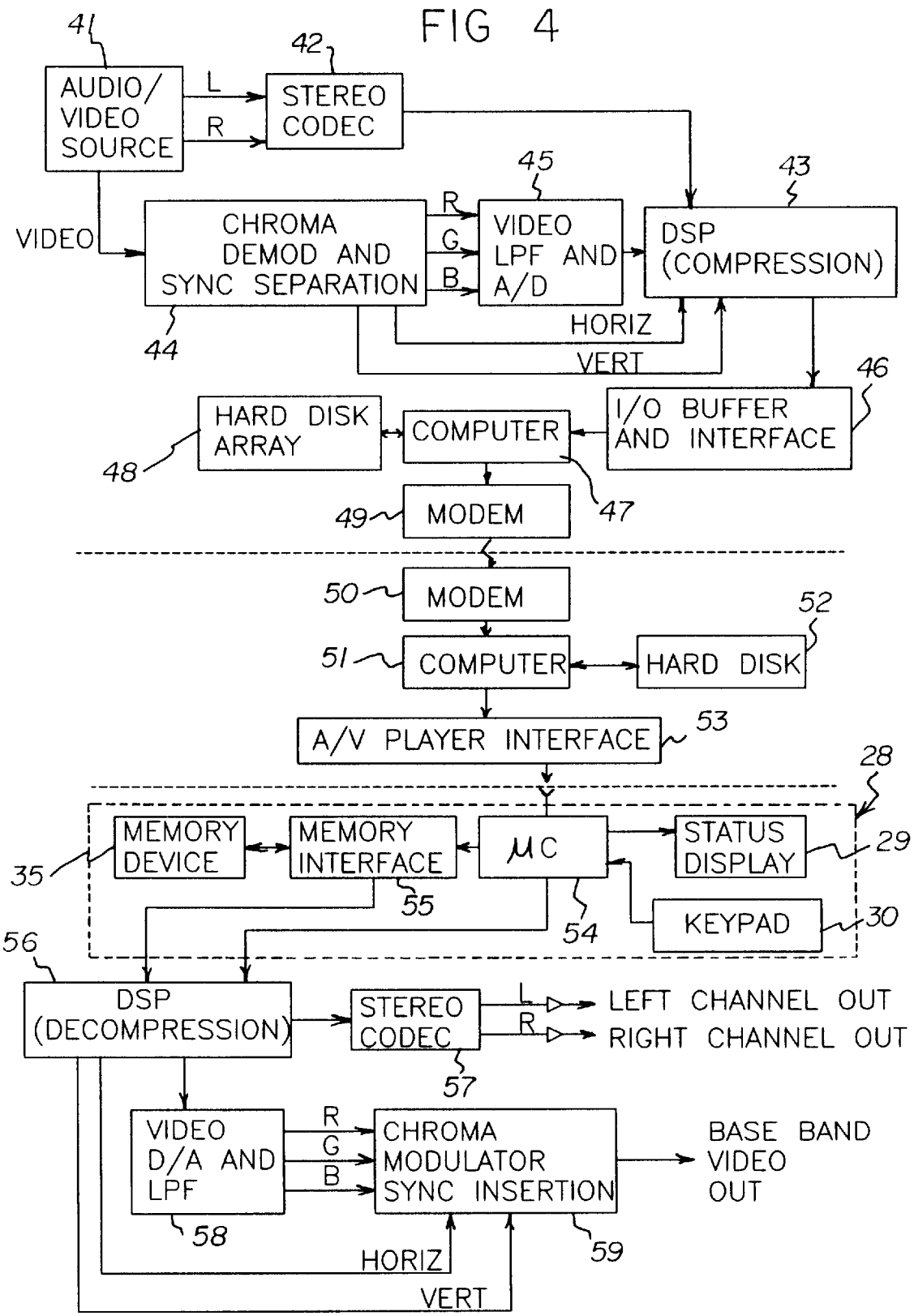

MULTI-MEDIA RECORDING SYSTEM AND METHOD

BACKGROUND OF THE INVENTION

1. Field of the Invention

The present invention relates to media devices and more particularly pertains to a new multi-media recording system and method for providing a new way to distribute music and movies to consumers.

2. Description of the Prior Art

The use of media devices is known in the prior art. More specifically, media devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art media devices include U.S. Pat. No. 5,286,908; U.S. Pat. No. 5,270,475; U.S. Pat. No. 5,305,423; U.S. Pat. No. 5,281,754; U.S. Pat. No. 5,243,123; and U.S. Pat. No. Des. 358,808.

While these devices fulfill their respective, particular objectives and requirements, the aforementioned patents do not disclose a new multi-media recording system and method. The inventive device includes a multi-media formatting center for processing audio/visual media to produce an audio/visual media signal, a first computer associated with the formatting center for storing the signal, a modem for transferring the signal over a communication channel, a second computer remote from the first computer which receives the signal, and a recording device which is interfaced with the second computer for recording the signal and processing the signal to reproduce the audio/visual media. The recording device preferably includes a detachable faceplate having a computer chip thereon for recording the signal.

In these respects, the multi-media recording system and method according to the present invention substantially departs from the conventional concepts and designs of the prior art, and in so doing provides an apparatus primarily developed for the purpose of providing a new way to distribute music and movies to consumers.

SUMMARY OF THE INVENTION

In view of the foregoing disadvantages inherent in the known types of media devices now present in the prior art, the present invention provides a new multi-media recording system and method wherein the same can be utilized for providing a new way to distribute music and movies to consumers.

The general purpose of the present invention, which will be described subsequently in greater detail, is to provide a new multi-media recording system and method apparatus and method which has many of the advantages of the media devices mentioned heretofore and many novel features that result in a new multi-media recording system and method which is not anticipated, rendered obvious, suggested, or even implied by any of the prior art media devices, either alone or in any combination thereof.

To attain this, the present invention generally comprises a multi-media formatting center for processing audio/visual media to produce an audio/visual media signal, a computer associated with the formatting center for storing the signal, a modem for transferring the signal over a communication channel, a second computer remote from the first computer which receives the signal, and a recording device which is interfaced with the second computer for recording the signal and processing the signal to reproduce the audio/visual media. The recording device preferably includes a detachable faceplate having a computer chip thereon for recording the signal.

The invention further comprises a method of recording audio/visual medium, the method including inputting audio/visual medium from a source into a multi-media formatting center, processing the medium in the formatting center to produce a signal which is then input into a first computer, relaying the signal from the first computer to a second computer via a communication channel, such as the Internet, and interfacing a recording device with the second computer in order to record the signal. The recording device preferably includes a detachable faceplate having a computer chip thereon for recording the signal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new multi-media recording system and method apparatus and method which has many of the advantages of the media devices mentioned heretofore and many novel features that result in a new multi-media recording system and method which is not anticipated, rendered obvious, suggested, or even implied by any of the prior art media devices, either alone or in any combination thereof.

It is another object of the present invention to provide a new multi-media recording system and method which may be easily and efficiently manufactured and marketed.

It is a further object of the present invention to provide a new multi-media recording system and method which is of a durable and reliable construction.

An even further object of the present invention is to provide a new multi-media recording system and method which is susceptible of a low cost of manufacture with regard to both materials and labor, and which accordingly is then susceptible of low prices of sale to the consuming public, thereby making such multi-media recording system and method economically available to the buying public.

Still yet another object of the present invention is to provide a new multi-media recording system and method which provides in the apparatuses and methods of the prior art some of the advantages thereof, while simultaneously overcoming some of the disadvantages normally associated therewith.

Still another object of the present invention is to provide a new multi-media recording system and method which provides a new way to distribute music and movies to consumers.

Yet another object of the present invention is to provide a new multi-media recording system and method which includes a multi-media formatting center for processing audio/visual media to produce an audio/visual media signal, a computer associated with the formatting center for storing the signal, a modem for transferring the signal over a communication channel, a second computer remote from the first computer which receives the signal, and a recording device which is interfaced with the second computer for recording the signal and processing the signal to reproduce the audio/visual media. The recording device preferably includes a detachable faceplate having a computer chip thereon for recording the signal. The method includes inputting audio/visual medium from a source into a multi-media formatting center, processing the medium in the formatting center to produce a signal which is then input into a first computer, relaying the signal from the first computer to a second computer via a communication channel, such as the Internet, and interfacing a recording device with the second computer in order to record the signal. The recording device preferably includes a detachable faceplate having a computer chip thereon for recording the signal.

Still yet another object of the present invention is to provide a new multi-media recording system and method that replaces the use of CD's, cassettes, tapes, etc.

Even still another object of the present invention is to provide a new multi-media recording system and method that eliminates the need to produce, manufacture, and ship CD's, cassettes, tapes, etc., thus eliminating these costs and potentially reducing the cost of music and video.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 shows a block diagram of a preferred embodiment of the system.

DESCRIPTION OF THE PREFERRED EMBODIMENT

With reference now to the drawings, and in particular to FIGS. 1 through 4 thereof, a new multi-media recording system and method embodying the principles and concepts of the present invention will be described.

Figure 1:
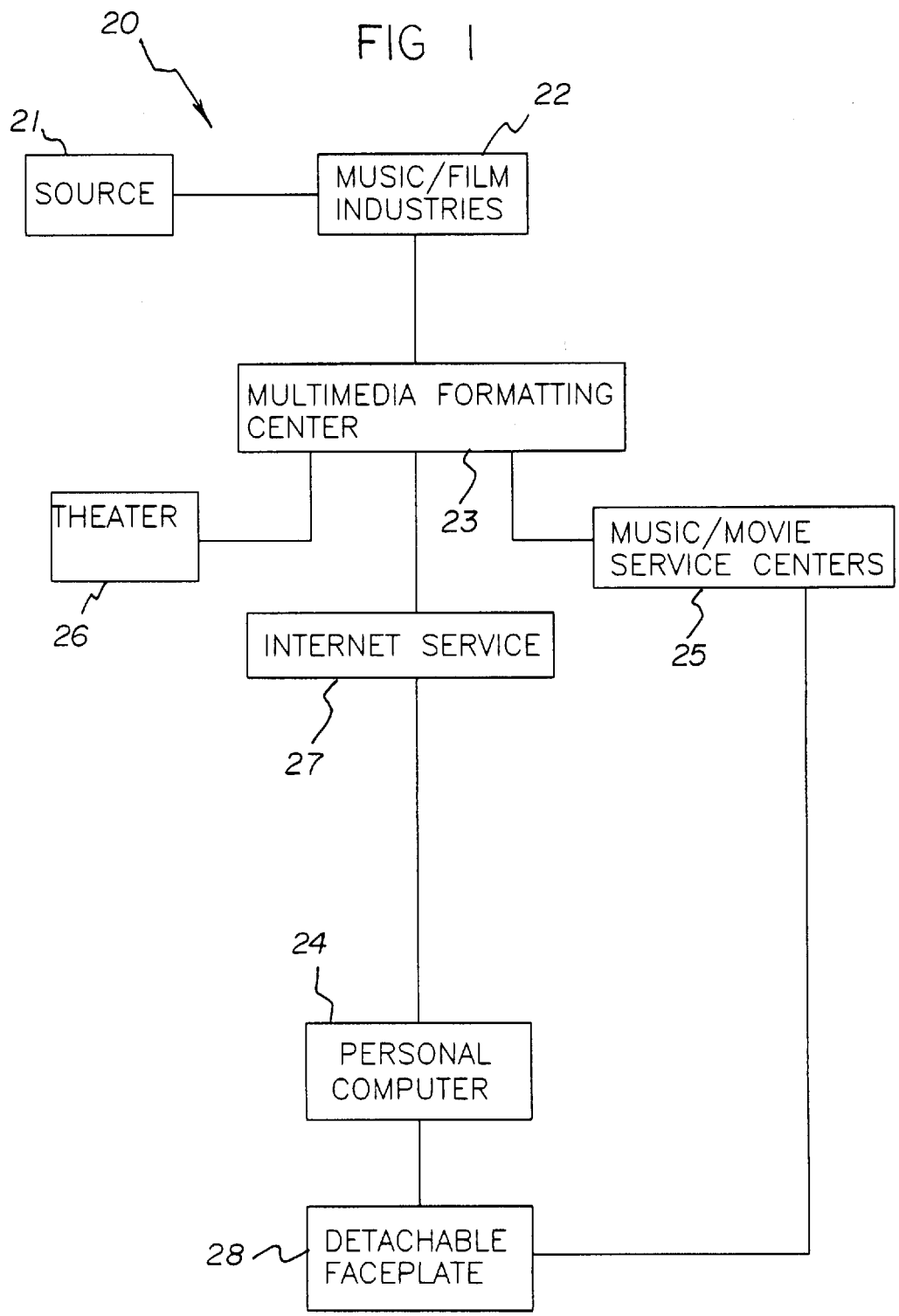
FIG. 1 shows a block diagram of the multi-media recording system and method according to the present invention.

As best illustrated in FIG. 1, the multi-media recording method 20 is shown. A source 21 of music or movies (audio/visual media), such as the musicians and actors/actresses, provide their services to the music/film industries 22 to produce the audio/visual media. The music/film industries 22 then supply the produced audio/visual media to a multi-media formatting center 23, where the individual audio/visual medium is processed to produce an audio/visual medium signal which is input into a first computer having sufficient storage capacity to store the signal. The signal is then relayed by suitable communication channels, such as through the Internet 27, to either a personal computer 24, a music/movie service center 25, or a theater 26. A detachable faceplate 28 having a recording system thereon is interfaced with either the personal computer 24 or the music/movie service center 25 in order to record the signal for later playback.

The personal computer 24 is preferably one which is located within a consumer's home. The computer 24 receives and stores the signal. The detachable faceplate 28 forms part of an audio/visual recording and playback device, such as TV's, home and car stereos, etc., and would be universal so that one faceplate would be useable with either a TV or stereo, and useable with other TV's and stereos. Such a faceplate would be similar to those being currently used on certain car stereos. However, the faceplate 28 of the instant invention includes a recording system thereon which is capable of recording either audio or video, or both. Thus, only the faceplate 28 needs to be interfaced with the computer 24 in order to record the signal thereon. Once the signal is recorded onto the recording system on the faceplate, the faceplate is attached to the rest of the recording and playback device, where the signal is then processed to reproduce the audio/visual medium for playback by the recording and playback device.

It is also contemplated that main portion of the recording and playback device would itself include recording means therein so that the signals recorded onto the recording system of the faceplate can be transferred to the recording means in the main portion of the recording and playback device, thus freeing up the recording system on the faceplate so that additional signals can be recorded thereon.

The music/movie service center 25 is used by consumers who don't have a personal computer, and is similar to currently used music and video stores, except that the center 25 includes a computer or computers which store audio/visual signals therein, similar to the computer 24. The consumer brings in the detachable faceplate 28 and selects which music and/or video they want recorded onto the recording system of the faceplate. Once this is done, the consumer brings the faceplate home and attaches it to the rest of the recording and playback device, for processing the signal to reproduce the audio/visual medium for playback by the recording and playback device. Again, the main portion of the recording and playback device can include recording means therein for recording the signals from the recording system on the faceplate.

The signals relayed to the theater 24 are processed by suitable means within the theater to reproduce the audio/visual medium for playback to an audience at the theater. Therefore the movies shown at the theater can be provided directly from the formatting center 23, permitting viewing of movies worldwide. Therefore theaters will no longer have to handle rolls of film and provide for storage thereof.

Figure 2:
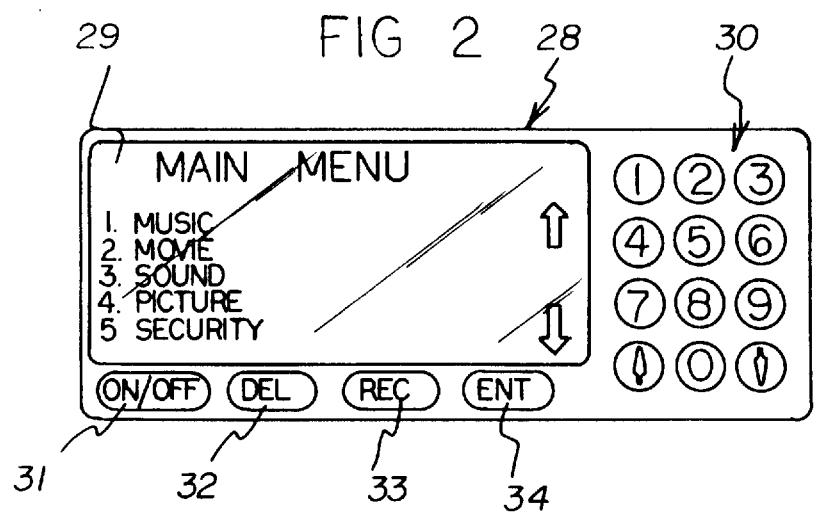
FIG. 2 shows a detachable faceplate useable with the invention.
Figure 3:
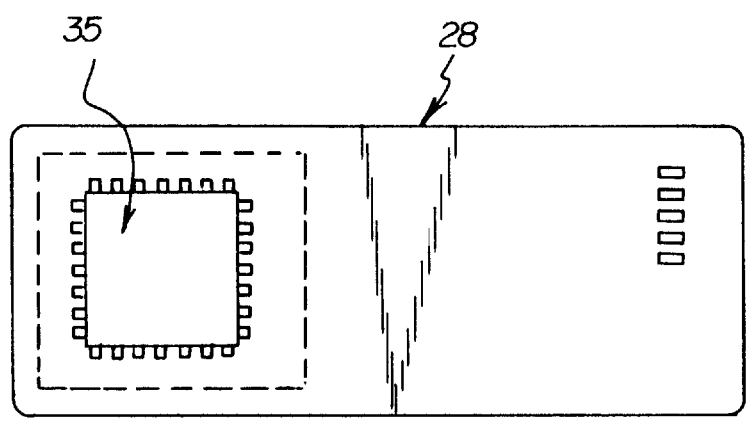
FIG. 3 is a view of the rear of the faceplate showing the recording computer chip mounted thereon.

FIGS. 2–3 illustrate an exemplary detachable faceplate 28. The faceplate includes a display screen 29 for displaying various menus and options associated with the faceplate. A keypad 30 is provided for entering data and selecting items on the menus. The faceplate 28 further includes an on/off button 31 for turning the faceplate on and off, a delete button 32 for deleting recorded material, a record button 33 for recording media onto the recording system, and an enter button 34 for entering data. For security, the faceplate should include a security number which needs to be entered before the faceplate is able to operate.

FIG. 3 illustrates the rear face of the faceplate 28, showing the recording system 35 mounted thereon. The recording system 35 comprises a computer chip or chips which is/are able to record audio/visual signals thereon. Since computer chips are small, they are easily integrated into the faceplate without taking up a large amount of space thereon. Once the desired music and/or videos are recorded onto the chip, the faceplate 28 is attached to the rest of the recording and playback device for playing the recorded music/videos.

Turning now to FIG. 4, illustrated therein is a preferred system 40 for use with the present invention. The audio/visual media is provided from a suitable source 41, such as the music/film industries 22. Music media is input into a stereo coder/decoder 42 which is a combined low-pass filter (LPF) and analog to digital converter (A/D converter), such devices being used for instance in "soundblaster" cards. The coder/decoder 42 digitizes each channel (left and right) of the stereo media and inputs the digitized signal into a digital signal processor (DSP) 43. Visual media from the source 41 is input into the separator 44 where the visual media is broken down into red, green, blue, and horizontal and vertical components. The red, green, and blue components are input into low pass filter and analog to digital converter 45, and then input into the DSP 43 along with the horizontal and vertical components. The DSP 43 is a microcontroller running an audio/video compression algorithm, such as MPEG. The compressed signals are held within the I/O buffer and interface 46 until the computer 47 is able to accept the data, where the data is then stored within a hard disk array 48 for subsequent modem 49 transfer. The elements 42–49 form the elements of the multi-media formatting center 23.

The modem 49 relays the signal(s) over a suitable communication channel, such as a phone line, ISDN, cable modem, satellite link, etc., to a modem 50 of a personal computer 51 located within a theater 26, home 24, or music/movie service center 25. The signal is stored within a local hard disk 52 for subsequent transfer of the signal. The computer 51 includes A/V player interface hardware 53 allowing the computer to be linked to an audio/visual recording and playback device.

The detachable faceplate 28 is then interfaced with the computer 51. The faceplate 28 includes a microcontroller 54 which handles control of the faceplate 28 and transfer of data to the chip 35. A memory interface 55 is provided to allow the microcontroller 54 and a DSP 56 to share the memory device 35. The faceplate 28 is then connected to the rest of the recording and playback device for processing and playback of the recorded media. The signal is decompressed within the DSP 56 and the audio signal is input to a stereo coder/decoder 57 to convert the signal back to left and right analog signals. The video signal is input to a video digital to analog converter and low pass filter 58, with the red, green, and blue color signals then being input into the insertion device 59, along with the horizontal and vertical components from the DSP 56, where the video media is thus reproduced for playback.

In use, assuming that the user has a home personal computer, the user interfaces the detachable faceplate with the computer. The user then access the desired music and movies through the user's internet provider 27. Normally, it is expected that an account will be set up between the user and the internet provider in order to pay for all music and videos which are recorded. Once the music and/or video is recorded onto the chip 35, the faceplate is attached to the rest of the recording and playback device, such as a television. The music and/or video can then be played back at the users convenience. If different music and video is desired, the faceplate is again interfaced with the computer, and new music/video selections recorded onto the chip. If a user does not have a home computer, he just has to bring his faceplate to a music/movie service center for recording selected music/video onto the chip. The faceplate can then be brought home for subsequent playback, or transferring of its recorded signals to a recording means on the main portion of the playback device. Transferring the signals allows the user to record additional signals onto the chip, while the previously recorded signals are safely stored within the main portion of the recording and playback device.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of recording audio/visual medium, comprising:

inputting the audio/visual medium from a source of audio/visual media into a multi-media formatting center;

processing the audio/visual medium in said multi-media formatting center in order to produce an audio/visual medium signal and inputting the signal into a first computer;

relaying the audio/visual medium signal from the first computer to a second computer via a communication channel;

interfacing an audio/visual medium recording device with the second computer in order to record the audio/visual medium signal.

interfacing the audio/visual medium recording device with an audio/visual medium playing device such that the recorded audio/visual signal can either be played or be transferred to a storage means for storing the audio/video medium signal within the audio/video medium playing device for later play at the convenience of a user.

2. The method of claim 1, further comprising the step of processing the audio/visual medium signal within the recording and playback device in order to reproduce the audio/visual medium.

3. The method of claim 1, wherein the step of interfacing the recording device with the second computer comprises interfacing a detachable faceplate from the recording and playback device with the second computer, said detachable faceplate including a recording system mounted thereon.

4. The method of claim 3, wherein the recording system comprises a computer chip.

5. A system of transferring and recording audio/visual media comprising:

a central media resource center, the resource center adapted to convert analog audio and visual media into a converted audio and video media format transferrable using computer transmission;

a transmission means for delivering the converted audio and visual media from the central media resource center to a base unit, the base unit including a home computer;

a detachable faceplate engageable to the base unit, the detachable faceplate adapted to receive and store the converted audio and visual media when engaged to the base unit;

a first security means for preventing reception and storage of the converted audio and visual media when the faceplate is not engaged to the base unit;

the detachable faceplate further engageable to a media player, the media player capable of playing the converted audio and visual media stored by the detachable faceplate;

a second security means for preventing playing of audio and visual media when the faceplate is not engaged to the media player; and the media player further having a storage means for storing converted media transferred from the detachable faceplate.

6. The system of transferring and recording audio/visual media as in claim 5, wherein the first security means comprises:

circuitry within the faceplate such that entry of a security code into the detachable faceplate is required before the faceplate can receive and store the converted audio and visual media.

7. The system of transferring and recording audio/visual media as in claim 5, wherein the second security means comprises:

circuitry within the faceplate such that entry of a security code into the detachable faceplate is required before the media player can play the converted audio and visual media.

8. The system of transferring and recording audio/visual media as in claim 6, wherein security code comprises a series of numbers.

9. The system of transferring and recording audio/visual media as in claim 7, wherein security code comprises a series of numbers.

* * * * *